Aug. 14, 1923.

J. W. DANAHER

GAS METER

Filed June 29, 1922

INVENTOR
J. W. Danaher
BY J. Edward Mayber
ATTY.

Patented Aug. 14, 1923.

1,464,972

UNITED STATES PATENT OFFICE.

JOHN W. DANAHER, OF TORONTO, ONTARIO, CANADA, ASSIGNOR TO THE STANDARD METER COMPANY LIMITED, OF TORONTO, CANADA.

GAS METER.

Application filed June 29, 1922. Serial No. 571,820.

*To all whom it may concern:*

Be it known that I, JOHN W. DANAHER, of the city of Toronto, in the county of York, Province of Ontario, Canada, a subject of the King of Great Britain, have invented certain new and useful Improvements in Gas Meters, of which the following is a specification.

This invention relates to devices for preventing the reversal of the direction of operation of the meter mechanism by the expedient of reversing the inlet and outlet connections of the meter and known as back checks or stops.

In such devices it is advisable that the tangent arm which actuates the recording mechanism of the meter should be permitted to make at least one complete circuit of its path in a reverse direction before being stopped by the check, as otherwise there is danger of the meter mechanism being damaged by any back pressure which may occur after gas flow from the meter is shut off. It is also desirable that the action of the check, when the meter is functioning normally, should be as quiet as possible, as under some conditions, the noise is objectionable. A back check must also be simple and absolutely reliable, and the object of my invention is to provide a back check which will satisfactorily fulfill all the required conditions.

I attain my object by utilizing a worm which is secured to the spindle of the tangent arm and which is adapted to engage and actuate one arm of a bell crank lever, the other end of which normally lies out of the path of the tangent arm and is passed by the tangent arm when the latter is travelling in the normal direction. A reversal of the direction of motion of the tangent arm causes the worm to engage the lever and rock it to draw its free end into the path of the tangent arm but, the worm being of small pitch, this does not take place until the tangent arm has made at least one complete revolution.

The invention is hereinafter more fully described and is illustrated in the accompanying drawings in which—

Figure 1:
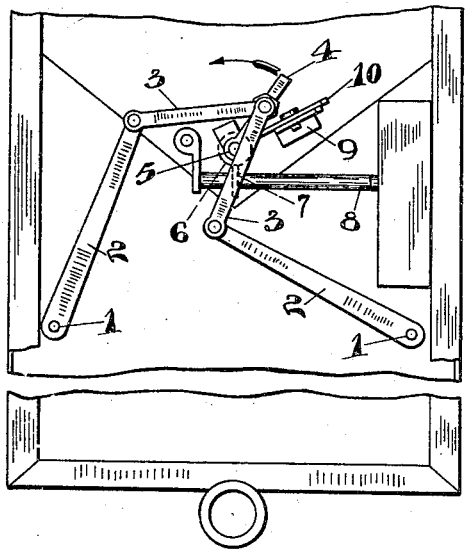
Figure 2:
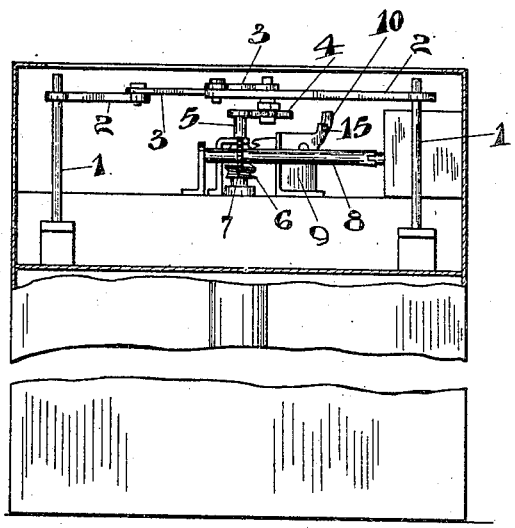
Figure 3:
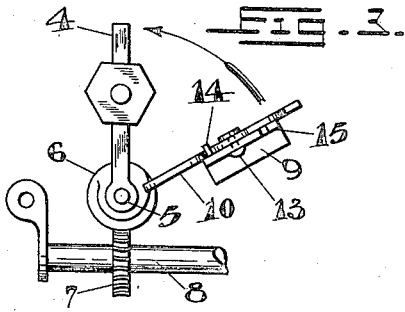
Figure 4:
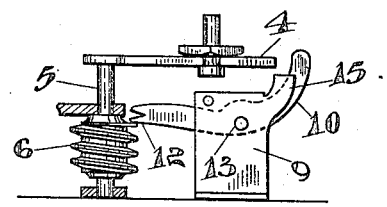
Figure 5:
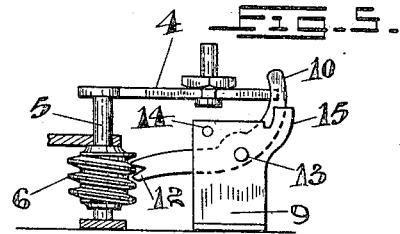

Fig. 1 is a plan view showing part of the mechanism of a meter provided with my improved back check;

Fig. 2 a side elevation of the same parts;

Fig. 3 a plan view of the back check and tangent arm;

Fig. 4 a side view of the same parts with the back check in inoperative position; and Fig. 5 a similar view showing the back check in operative position.

In the drawings like numerals of reference indicate corresponding parts in the different figures.

Referring particularly to Figs. 1 and 2, 1 are the flag wires of an ordinary gas meter, to which are connected the rock arms 2 connected by links 3 with a tangent arm 4, which is connected to the vertical spindle 5. These parts are old in the art, and it will be understood that by the rocking of the arms 2 that the tangent arm is moved in a circular orbit to rotate the spindle 5. This spindle carries a worm 6, which meshes with a worm wheel 7 on a horizontal spindle 8, which is adapted to operate the recording mechanism, not shown.

Adjacent the worm 6 is secured on the meter casing a bracket 9, and on this bracket I fulcrum a bell crank lever 10. One end of this bell crank lever is adapted to engage the worm 6, while the other end is adapted, when the lever is rocked, to move into or out of the path of the end of the tangent arm 4. The worm 6 is preferably formed with a V-thread, and the end of the bell crank lever, which it engages, is preferably forked to engage over the thread, as shown. The result of this arrangement is that when the worm is rotated in its normal direction, as indicated by the arrow in Fig. 3, the adjacent end of the bell crank lever rides on top of the thread of the worm, dropping slightly as the extreme end of the thread passes underneath it, but, owing to the small pitch of the thread, this drop is not sufficient to raise the outer end of the bell crank lever into the path of the tangent arm. This drop is made very small, and therefore practically noiseless by the expedient of making the extreme end of the thread of the worm approach somewhat the underlying portion of the thread, as seen particularly in Fig. 4, so that there is a very narrow space between the exreme end and the underlying part of the thread. The lower part 12 of the forked end of the bell crank lever is made sufficiently narrow to pass readily through this space when the direction of rotation of the worm is reversed.

The fulcrum 13 of the bell crank lever is, of course, so positioned that the bell crank lever tends to rock by gravity to its checking position.

A pin 14 is preferably provided secured to the bracket 9 and extending above the inner part of the bell crank lever so as to prevent the inner end being thrown up too far from any cause. As long as the meter is operating normally and the worm 6 rotating in the normal direction, the bell crank lever occupies substantially the position shown in Fig. 4, merely rocking slightly as the end of the worm passes underneath it. If, however, the direction of operation of the meter be reversed, the direction of rotation of the worm is reversed and the end of the bell crank lever is engaged, the worm actuating the bell crank lever to throw its upper end into the path of the outer end of the tangent arm, as shown in Fig. 5. The pitch of the worm is such that this does not take place before the tangent arm has made one complete revolution.

It will be noted that the bracket 9 has a part 15 extended up behind the outer end of the bell crank lever to support the latter, and thus relieve the strain on the fulcrum, when the bell crank lever is engaged by the tangent arm and operates as a back check.

The construction shown satisfactorily attains the object of my invention as set forth in the preamble to this specification, and the result is obtained with the addition of but one movable part to the meter.

What I claim as my invention is:—

1. In a meter provided with a suitably actuated tangent arm and a spindle connected to and rotated by said tangent arm; the combination therewith of a lever suitably fulcrumed so that one end may be brought into or out of the path of the tangent arm; and a worm secured to the spindle adapted to engage and actuate the lever to bring the latter to or from a tangent arm engaging position according to the direction of rotation of the spindle.

2. A gas meter constructed as set forth in claim 1 in which the lever is of the bell crank type and positioned so that its outer end moves in a direction towards and away from the spindle, the other end of the lever riding on the end of the worm when the spindle is rotating in its normal direction.

3. In a meter provided with a suitably actuated tangent arm and a spindle connected to and rotated by said tangent arm; the combination therewith of a lever suitably fulcrumed so that one end may be brought into or out of the path of the tangent arm; and a worm secured to the spindle adapted to engage and actuate the lever to bring the latter to or from a tangent arm engaging position according to the direction of rotation of the spindle, and a stop limiting the movement of the lever away from the path of the tangent arm.

4. In a meter provided with a suitably actuated tangent arm and a spindle connected to and rotated by said tangent arm; the combination therewith of a lever suitably fulcrumed so that one end may be brought into or out of the path of the tangent arm, the other end of the lever being forked; and a worm secured to the spindle adapted to engage the forked end of the lever to actuate the latter to or from a tangent arm engaging position according to the direction of rotation of the spindle.

Signed at Toronto, Canada, this 16th day of June, 1922.

JOHN W. DANAHER.